March 9, 1943.    W. VAN B. ROBERTS    2,313,699
POWER MEASURING DEVICE
Filed April 27, 1940

INVENTOR.
WALTER VAN B. ROBERTS
BY
ATTORNEY.

Patented Mar. 9, 1943

2,313,699

UNITED STATES PATENT OFFICE 2,313,699

POWER MEASURING DEVICE

Walter van B. Roberts, Princeton, N. J., assignor to Radio Corporation of America, a corporation of Delaware Application April 27, 1940, Serial No. 331,980

6 Claims. (Cl. 172—245)

The present invention relates to power indicators in general and, in particular, to radio frequency power indicators.

An object of the present invention is to provide a power indicating device for radio frequency circuits which does not itself absorb appreciable power from the circuit or affect the electrical characteristics thereof.

Another object is to provide not only an indication of power delivered into a load circuit, but, also, an indication of the power factor of the circuit into which power is delivered.

Still another object is to provide an instrument which, in addition to indicating power and power factor, will also indicate percentage modulation of a modulated radio frequency current supplied to a load.

In accordance with the invention, a cathode ray oscilloscope is employed, one set of deflector plates being supplied with voltage proportional to the voltage across the load, and the other set of plates being supplied with a voltage which is proportional to the rate of change of current through the load. In the case of a substantially constant frequency alternating current, the result of these deflection voltages is to produce in general an elliptical pattern on the oscilloscope screen. If the load voltage is 90° out of phase with the load current, and if the horizontal and vertical deflections are made equal for convenience, the trace will be a straight line inclined at 45°. As the load current comes into phase with the voltage, the pattern becomes elliptical and its area is proportional to the power delivered to the load, while the inclination of its axis changes until finally, when the load current is in phase with the voltage, an axis of the ellipse coincides with the line between a pair of opposing deflector plates. The ellipse becomes a circle if the two deflection voltages are adjusted to equal values.

Thus, not only may the power be judged approximately by the area of the ellipse, but the power factor may also be inferred from the orientation of an axis of the ellipse with respect to a line between a pair of opposing deflector plates. Furthermore, if the radio frequency current is modulated, the ellipse will alternately expand and contract in accordance with the modulating wave. In the condition of 100% modulation, it will expand to twice the unmodulated radius and contract to substantially a point. Due to persistence of vision, the indication will appear to the eye as a more or less elongated doughnut whose aperture just vanishes at 100% modulation.

Figure 1:
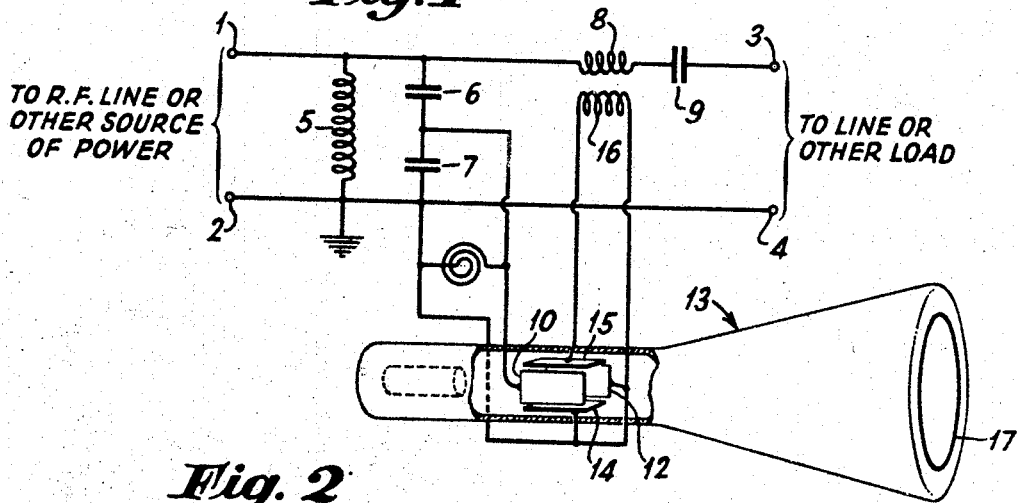
Figure 2:
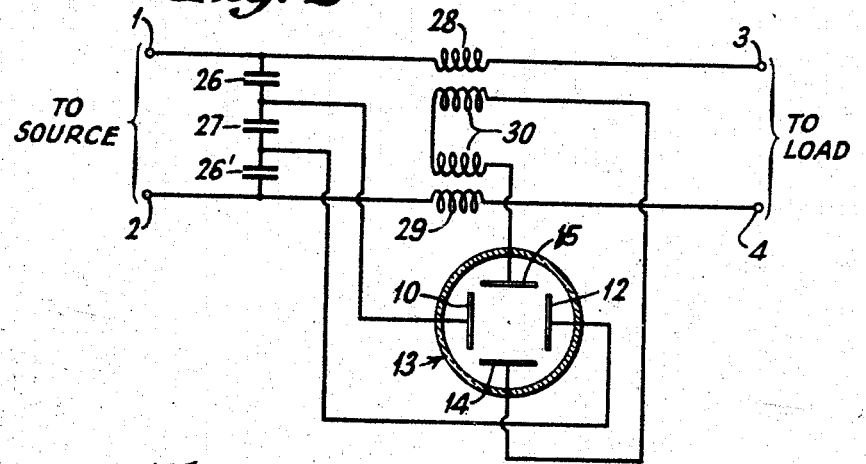
Figure 3:
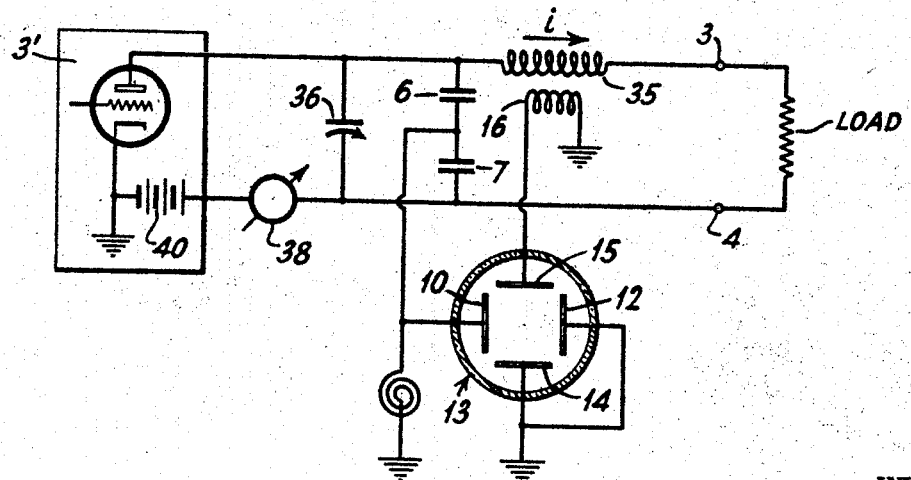

Further objects, features and advantages of the present invention will become apparent from the following detailed description which is accompanied by a drawing in which Figure 1 represents the invention as applied to any type of unbalanced load, that is, one which is unsymmetrical with respect to ground; Figure 2 shows the power indicator connected to a balanced load which is symmetrical with respect to ground and Figure 3 shows the application of the present invention to the output circuit of a power amplifier tube.

In Figure 1, terminals 1 and 2 are indicated as energized from any conventional source of radio frequency power such as a radio frequency transmission line or the like. Terminals 3 and 4 are connected to any desired load or to a transmission line leading thereto.

Shunted between one pair of the aforesaid terminals, preferably terminals 1 and 2, there is disposed an anti-resonant or shunt circuit presenting a high impedance to the operating frequency and comprising coil 5 in parallel with condensers 6 and 7, which are connected in series. Terminals 2 and 4 are directly connected together for an unbalanced load and are conventionally indicated as being grounded since one side of an unbalanced load is ordinarily at ground potential. Terminals 1 and 3 are connected through a series resonant circuit including coil 8 and condenser 9. The combination of series and shunt impedances presented by the tuned circuits acts as a filter section passing waves of the desired frequency to the substantial exclusion of others. The junction of the capacities of condensers 6 and 7 is connected to a deflector plate 10 of an oscilloscope indicated generally by reference numeral 13. In the example shown, 10 is one of a pair of horizontal deflection plates. The other horizontal deflection plate 12 is connected to terminal 2. The ratio of capacities 6 and 7 is chosen to give a suitable magnitude of voltage for application to the oscilloscope, while the effective capacity of the two condensers in series is such that with inductance 5, a desired impedance is presented to the frequency employed. The vertical deflection plates 14, 15 of the oscilloscope 13 are connected to a pickup coil 16 coupled with inductance 8 and one of the vertical plates is furthermore connected to terminal 2 and thus to ground. The coupling is made sufficient to produce a suitable deflection voltage and preferably such as to produce, under normal operation, equal vertical and horizontal deflections. It will be seen that the horizontal deflection is proportional to the voltage of the source while the vertical deflection is proportional to the rate of change of the load current. Thus, in case the load current is in phase with the voltage of the source, the two deflections will be 90° out of phase with each other and, as before mentioned, will produce, in general, an elliptical trace with its axes lined up with the deflection plates. The end of the oscilloscope may have painted thereon for convenient reference an ellipse or circle as the case may be, which represents normal power flow. This is indicated by reference character 17.

Figure 2 shows how the power flow into a balanced load may be measured. Here again, a capacity potentiometer 26, 27, 26' is employed to obtain a voltage of suitable magnitude for connection to the horizontal deflector plates 10, 12. The voltage applied may be adjusted by varying the ratio of the capacity of condenser 27 with respect to the capacities of condensers 26 and 26'. Also, voltage for the vertical deflection plates 14, 15 is obtained by an inductive coupling through coils 30 to inductances 28, 29 connected in series between the source and the load.

The theory of operation is the same as in Figure 1 but the elements between input terminals 1 and 2 and output terminals 3 and 4 are not adapted in this particular case to feeding all types of load without affecting the input impedance between input terminals. Elements similar to those of Figure 1 could be used, but in case the load is known to be a pure resistance, it is not necessary to employ individually resonant elements. The series inductances and shunt capacity may be so chosen in a manner well known in the art, that the interposition of the section between terminals 1 and 2, and 3 and 4, does not change the resistance into which the source of power works, or does change it by a desired and predetermined amount.

Figure 3 shows how the present power measuring arrangement may be applied to the output of a radio frequency power amplifier indicated generally by box 31. In this case, the horizontal deflection voltage applied to plates 10, 12 of oscilloscope 13 is again obtained by a capacity potentiometer 6, 7 across the tank circuit of the amplifier, which comprises inductance 35 and tuning condenser 36. The vertical deflection voltage applied to plates 14, 15 is obtained by inductive coupling of coil 16 with the tank circuit inductance 35. The operation is as in Figure 1, except that advantage is taken of the tank circuit inductance to eliminate the necessity for providing a special inductance for the load current.

In practice the oscilloscope may be calibrated as follows: First, the amplifier is operated with its tank circuit shorted to produce rated dissipation at the anode, which may be measured in any convenient manner, such as, for example, by noting the temperature of the anode with an optical pyrometer. Then the stage is operated normally and the load adjusted until the anode dissipation is again of rated value as determined by the pyrometer. The product of the plate current as indicated by meter 38, and anode supply voltage from source 40 is then equal to the total power input to the tube. If the anode dissipation is subtracted therefrom, the remainder is the total power output of the tube. The area of the ellipse 17 may then be adjusted to a convenient size, which may thereafter be taken as a measure of the total power output. Of course, this total power output includes the losses in the tank circuit coil 35. If desired, these losses may be measured by shorting the external load and, although the tank coil loss is greater in this condition, it may be subtracted from the total tube output to give only slightly less than the actual power delivered to the load. For accuracy, the tank voltage may be adjusted to the same value as in the loaded condition, in which case the power output is the normal tank coil loss.

As explained previously, the oscilloscope thus affords a convenient qualitative monitor of the power output, the power factor of the tank circuit, including its load, and the amount of modulation that there may be imposed upon the current delivered to the load. The indication of power output is very useful in the case of tubes whose anodes do not show appreciable color at rated dissipation, as the actual anode dissipation may be determined by subtracting from the total input power, as determined from the anode current and voltage, the output power as determined from the oscilloscope. In this way, unintentional overheating of the anode may be avoided.

While I have described several modifications of my invention, I do not consider the invention itself to be limited except in accordance with the following claims.

I claim:
1. Means for indicating the flow of power from a source of power to a load comprising a filter section connected between said source and said load and including series inductance and shunt capacity elements, said elements being so chosen that the input impedance of said section is substantially the same as the impedance of said source and the output impedance of said section is substantially the same as the impedance of said load, connections from said shunt element to a pair of deflector plates of an oscilloscope and a pick-up coil coupled to said series inductance and connected to another pair of deflector plates of said oscilloscope.

2. Means for indicating the flow of power from a source of power to a load comprising a filter section connected between said source and said load and including series and shunt elements, said elements being so chosen that the input impedance to said section is substantially the same as the impedance of said load, connections from said shunt element to a pair of deflector plates of an oscilloscope, and a coupling between another pair of deflector plates of said oscilloscope to said series element.

3. Indicating means for a power amplifier stage including a tank circuit comprising shunt capacity and a tank coil in series with a load connected across said capacity, comprising an oscilloscope having horizontal and vertical deflector plates, means for energizing one pair of said plates from said shunt capacity, and a pick-up coil coupled to said tank inductance and connected to said other pair of plates.

4. A filter network for matching a high frequency energy source to a load including shunt capacity elements and series inductive elements, said elements being so proportioned as to present to said source an impedance equal to the impedance of said source, an oscilloscope having separate means for deflecting a visible means of indication in a pair of mutually perpendicular directions, means for so energizing one of said deflecting means from said shunt capacity elements that said indication is deflected an amount proportional to the voltage across said shunt capacity elements and means coupled to said series inductive elements for energizing the other of said deflecting means so that said indication is deflected an amount proportional to the current flowing through said inductive elements.

5. A circuit having a pair of input terminals adapted to be connected to a source of high frequency energy and a pair of output terminals adapted to be connected to a load, an anti-resonant circuit connected across said input terminals, an oscilloscope having separate means for deflecting a visible indication in two mutually perpendicular directions, means for so energizing said deflecting means that said indication is deflected an amount proportional to the instantaneous value of the voltage across said anti-resonant circuit, a series resonant circuit connected between an input and an output terminal, and means for so energizing the other of said deflecting means that said indication is deflected an amount proportional to the instantaneous value of the current flowing through said input terminals to said output terminals.

6. A filter network having a pair of input terminals adapted to be connected to a source of high frequency energy and a pair of output terminals adapted to be connected to a load, an oscilloscope having separate means for deflecting a visible indication in two mutually perpendicular directions, said network including shunt capacity elements, means for so energizing one of said deflecting means from said capacity elements that said indication is deflected an amount proportional to the instantaneous value of voltage across said input terminals, an inductance connected between an input and an output terminal and means coupled to said inductance for so energizing the other of said deflecting means that said indication is deflected an amount proportional to the instantaneous value of the current flowing from said input terminals to said output terminals.

WALTER van B. ROBERTS.